(No Model.) 2 Sheets—Sheet 1.

J. W. TERRY.
PLANTER AND FERTILIZER DISTRIBUTER.

No. 601,537. Patented Mar. 29, 1898.

WITNESSES:
Edward Thorpe
J. Fred Acker

INVENTOR
J. W. Terry.
BY
ATTORNEYS.

(No Model.) 2 Sheets—Sheet 2.
J. W. TERRY.
PLANTER AND FERTILIZER DISTRIBUTER.
No. 601,537. Patented Mar. 29, 1898.
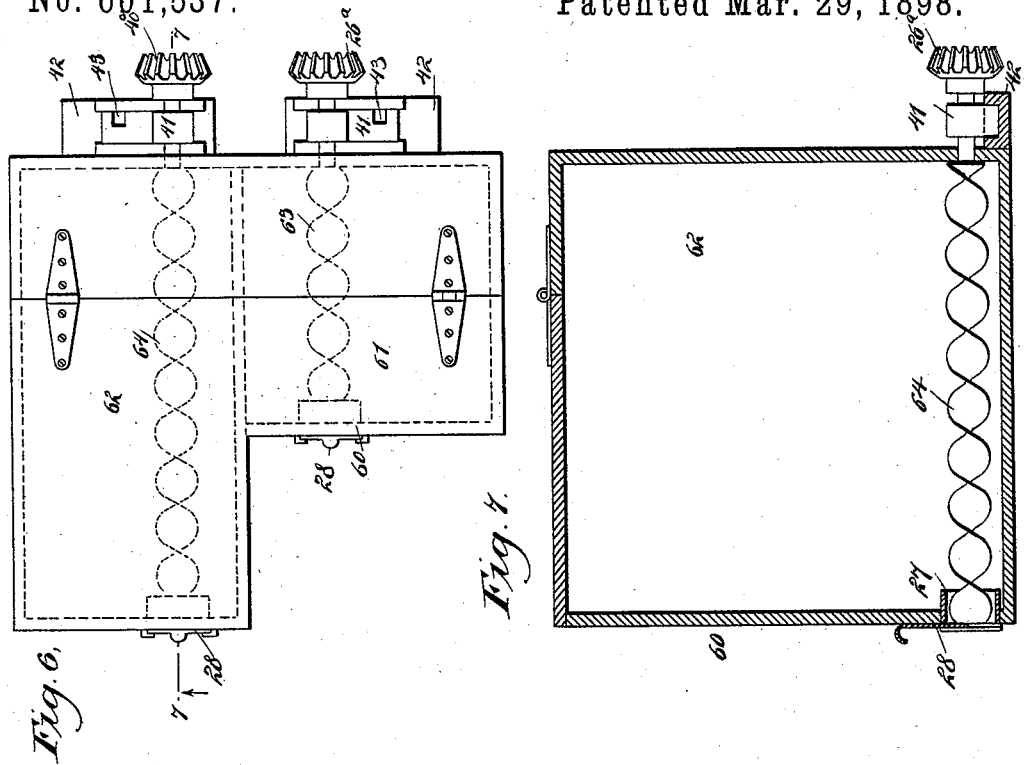
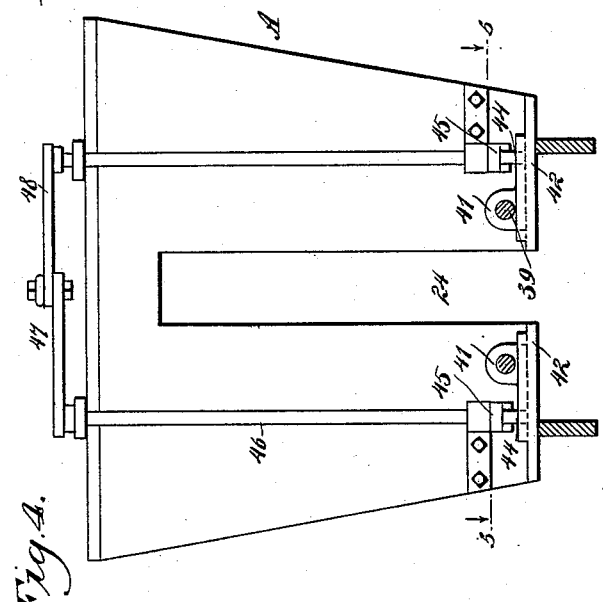
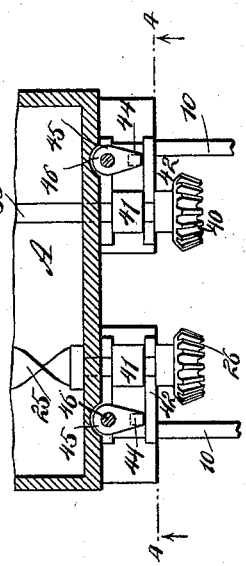
WITNESSES:
Edward Thorpe
J. Fred Acker
INVENTOR
J. W. Terry
BY
ATTORNEYS.

UNITED STATES PATENT OFFICE.

JOSEPH W. TERRY, OF BREWTON, ALABAMA.

PLANTER AND FERTILIZER-DISTRIBUTER.

SPECIFICATION forming part of Letters Patent No. 601,537, dated March 29, 1898.

Application filed May 8, 1897. Serial No. 635,685. (No model.)

*To all whom it may concern:*

Be it known that I, JOSEPH W. TERRY, of Brewton, in the county of Escambia and State of Alabama, have invented a new and Improved Planter and Fertilizer-Distributer, of which the following is a full, clear, and exact description.

The object of the invention is to provide a machine which will at the same time plant corn or similar seed and distribute fertilizer in the hills and which may also be used for sowing seed broadcast, if desired.

A further object of the invention is to provide a light, durable, and economic machine capable of opening a furrow, depositing a fertilizing material therein, sowing any kind of seed in any quantity, covering the seed, rolling the ground, and leaving the land in perfect condition to be cultivated, which cultivation can be afterward done by bringing into action certain parts of the machine, through the medium of which a growing crop can be fertilized and cultivated in the most efficient manner.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
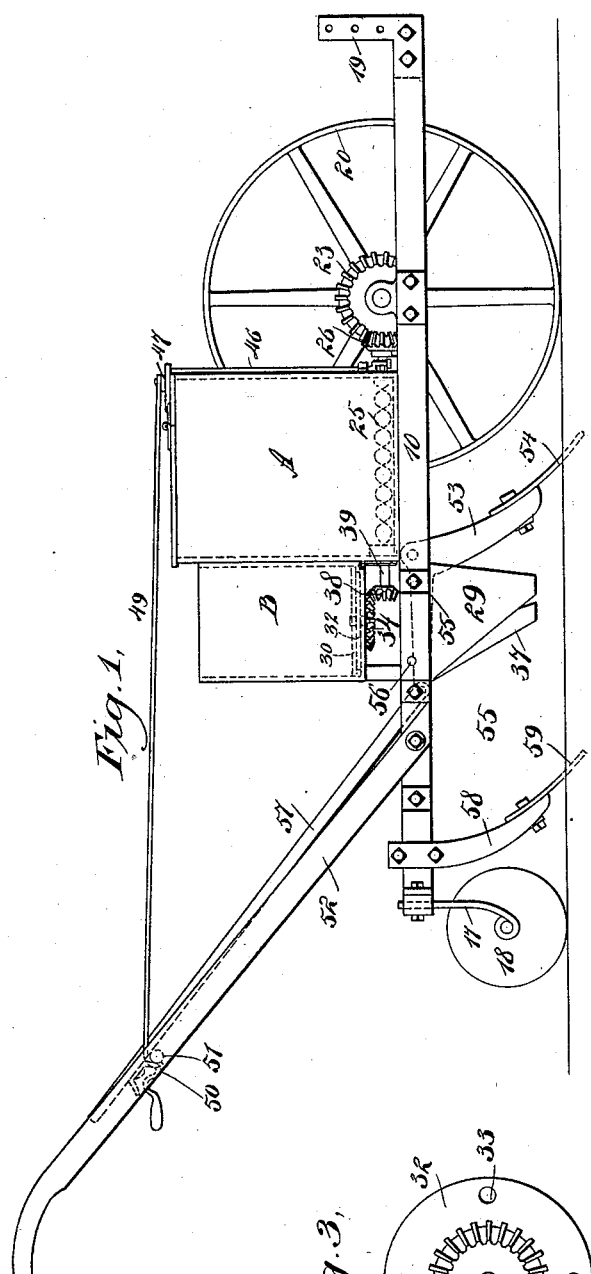
Figure 3:
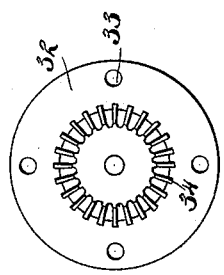
Figure 2:
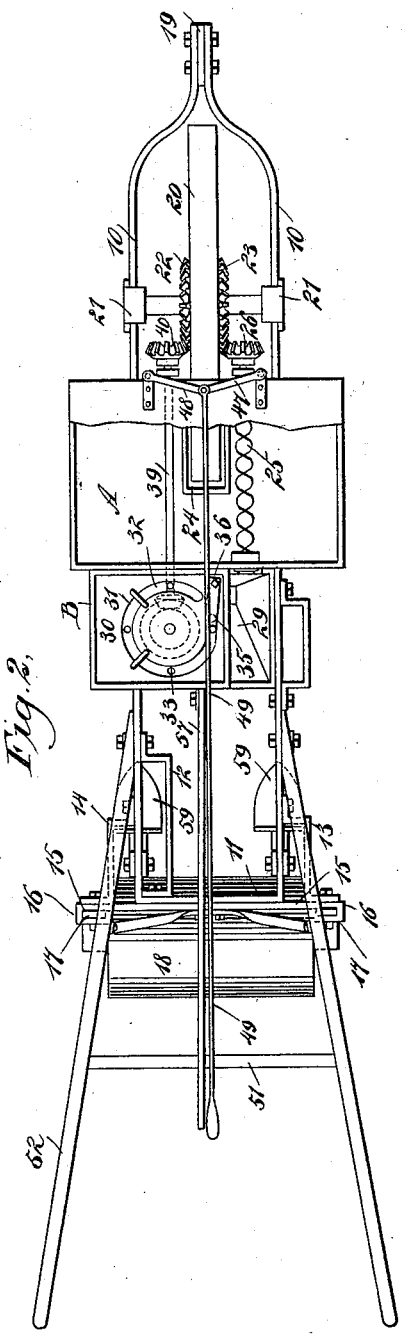

Figure 1 is a side elevation of the improved machine. Fig. 2 is a plan view thereof, the covers of the hoppers being removed. Fig. 3 is a bottom plan view of the planting disk or wheel. Fig. 4 is a front elevation of one of the hoppers, showing the frame in transverse section, the said section being taken practically on the line 4 4 of Fig. 5. Fig. 5 is a horizontal section taken substantially on the line 5 5 of Fig. 4. Fig. 6 is a plan view of a hopper in which seed and a fertilizing material are carried in separate compartments, and Fig. 7 is a section on the line 7 7 of Fig. 6.

The frame of the machine consists of side pieces 10, which are preferably brought together at the front and are connected at the back by a cross-bar 11, and at the back suitable braces 12, 13, and 14 are located to strengthen the frame without adding materially to its weight. At the back of the frame a transverse bar 15 is located, extending beyond the sides of the frame, and the said bar is provided at each end with an eye or a socket 16. In each of these eyes or sockets the upper end of a standard 17 is adjustably secured, the trunnions of a roller 18 being journaled in the lower ends of said standards.

At the front end of the frame an apertured arm 19 is upwardly extended, being a draft-arm, and the apertures provided are for regulating the draft. Near the forward end of the frame the trunnions of a wheel 20 are journaled in suitable boxes 21, the wheels being adapted to travel on the ground, and at one side of the hub of the wheel a beveled gear 22 is secured, a similar gear 23 being attached at the opposite side of said wheel. A box or a hopper A is supported on the frame at the rear of the wheel, adapted to contain a fertilizing material, and said box is provided with an opening 24 in its front central portion, in which the wheel 20 partially revolves.

Adjacent to the left-hand side of the rear portion of the large box or hopper A a smaller box or hopper B is supported on the frame, adapted to contain the seed to be planted. At the right of the center of the fertilizer box or hopper a screw 25 is mounted to turn, the forward end of the screw being secured to a shaft carrying a beveled pinion 26, which meshes with the beveled gear 23 on the front wheel 20. The rear end of the screw 25 is loosely fitted in a sleeve 27, placed in the bottom portion of the box A, as shown in Fig. 7, and the opening thus provided may be closed or the amount of material delivered to the screw regulated by means of a gate 28.

The fertilizing material is delivered by the screw into a chute 29, located at the left-hand side of the machine. A plate 30 is fitted in the bottom portion of the seedbox B. This plate is provided with a segmental groove 31, and beneath the bottom plate 30 a seed-distributing wheel 32 is mounted to revolve in the bottom of the seedbox, the said seed-distributing wheel being provided with a number of openings 33, adapted to receive seed and so arranged that the opening will be exposed at the segmental slotted portion 31 of the plate 30. A beveled gear 34 (shown in detail in Fig. 3) is secured upon the under face of the seed-distributing wheel and extends through an opening in the bottom of the seedbox, as illustrated in Fig. 1. The gear 34 is in mesh with a pinion 38, which is secured on a shaft 39, carried through the fertilizer box or hopper and out through the forward end of the same, a pinion 40 being secured to the forward end of the shaft 39, meshing with the gear 22 on the front wheel 20. The seed delivered by the distributing-wheel 32 is received in a chute 37, located at the left-hand side of the frame and opposite the chute 29, receiving the fertilizing material.

The seed to be discharged is received in an opening 35 when said opening is in registry with one of the seed-receiving openings 33 in the seed-distributing wheel, and in order that no more seed shall be discharged than can be readily contained within an opening 33 of the seed-distributing wheel, and in order that the flow of seed shall not be continuous, a spring 36 is attached to the bottom plate 30 of the seedbox, being carried at its free end over the opening 35 in the bottom proper of the seedbox, as is shown in Fig. 2.

The distributing mechanism for the fertilizing material and the seed may be thrown out of gear with the supporting-wheel 20 whenever desired. This is accomplished by journaling the shafts on which the gears 26 and 40 are secured in boxes 41, held to slide in ways or brackets 42, formed on the front bottom portion of the box or hopper A, one at each side of its center, as shown in Figs. 4 and 5. Each box 41 is provided with an opening 43, and each opening receives a stud 44, projected downward from a crank-arm 45, each crank-arm being attached to a vertical shaft 46, journaled at the front of the hopper or box A, the upper end of one shaft being pivotally attached to a crank 47, the corresponding portion of the opposite shaft being attached to a link 48, and both links are connected with a lever 49, which is carried rearward preferably to a locking engagement with a cross-bar 51, connecting the handles 52, attached to the frame, and ordinarily the handle end of the lever 49 is provided with a series of curved surfaces 50. (Shown in Fig. 1.)

The shank 53 to which the opening-plow 54, is attached, is located immediately at the rear of the supporting-wheel 20, being pivoted upon a cross-bar or a rod carried from side to side of the frame. The shank of the opening-plow is provided with a rearwardly-extending arm 55, which is engaged at the top by a pin 56, serving to hold the opening-plow in the ground when the machine is in operation. When, however, it is desired to raise the opening-plow from the ground—as, for example, in turning corners or for other purposes—a shifting rod or lever 57 is pushed forward, being pivotally attached to the rear end of the arm 55 and being adapted at its opposite end for locking engagement with the aforesaid handle cross-bar 51.

A forwardly-curved shank 58 is adjustably attached to each side of the frame near the rear, and each shank 58 carries at its lower end a covering-plow 59, the two plows 59 being so arranged that after the furrow has been opened by the forward plow 54 and the seed and fertilizer deposited in said furrow the covering-plows will turn the earth over the seed and fertilizer, filling the hill or furrow, while the roller 18 following will roll the surface to such an extent as to press the earth firmly down upon the seed. The adjustment of the roller 18 serves also to regulate the depth at which the opening-plow shall enter the ground.

When the machine is to be used for broadcast sowing, for example, or when certain kinds of seed are to be planted, the hopper shown in Figs. 1 and 2 may be substituted by the hopper or box 60, (shown in Figs. 6 and 7,) in which it will be observed that the box or hopper is L-shaped in plan and is divided into two compartments by means of a central partition—a small compartment 61, intended to hold fertilizing material, and a larger compartment 62, adapted to contain seed. In this case a screw 63, corresponding to the screw 25, is employed in the compartment for the fertilizing material for the purpose of discharging the same, while a second screw 64 is in like manner mounted in the seed-compartment and serves to distribute the seed, both the fertilizer and the seed passing out into their respective chutes through guide-openings in the back of the hopper or box. The same style of boxes are employed for the forward ends of the screws and the same shifting device heretofore described, and pinions 26ª and 40ª, corresponding to the pinions 26 and 40, are connected with the several screws, being driven from the large front wheel 20.

Having thus described my invention, I claim as new and desire to secure by Letters Patent—

1. The combination, with a frame, a roller located at one end of the frame, a drive-wheel mounted to support the opposite end of the frame carrying the gears, an opening-plow located at the rear of said drive-wheel, a rocking shank for the said plow, and a shifting lever connected with the said rocking shank, of hoppers or boxes, one adapted to contain fertilizer and the other seed, a distributing device located within each hopper, operating independently, each distributing device having a pinion connected therewith for engagement with the driving-gears on the driving-wheel, sliding boxes in which one end of each distributing device is journaled, shifting levers connected with said boxes, and means, substantially as described, for simultaneously operating said shifting levers, as and for the purpose specified.

2. The combination, with a frame, a roller located at one end of the frame, a drive-wheel mounted to support the opposite end of the frame carrying the gears, an opening-plow located at the rear of the said drive-wheel, a rocking shank for the said plow, and a shifting lever connected with the said rocking shank, of hoppers or boxes, one adapted to contain fertilizer and the other seed, a distributing device located within each hopper, operating independently, each distributing device having a pinion connected therewith for engagement with the driving-gears on the driving-wheel, sliding boxes in which one end of each distributing device is journaled, shifting levers connected with the said boxes, means, substantially as described, for simultaneously operating the said shifting levers, covering-plows located at the rear of the machine in front of the roller, and chutes located at the rear of the opening-plow, being arranged to receive material from the distributing devices in the boxes, as and for the purpose specified.

3. The combination, with a frame, a hopper or box mounted on the frame, a screw adapted to deliver material, held to turn in one compartment of the box or hopper, and a seed-distributing device mounted to revolve in a second compartment of the box or hopper, and a driving-wheel located at the front of the frame, provided with driving-gears, pinions connected one with the seed-distributing device and the other with the screw, the pinions being adapted for engagement with the said driving-gears, of sliding boxes in which the shafts carrying the said pinions are journaled, crank-arms connected with the said boxes, levers connected with the said crank-arms, links connecting the said levers, and a shifting rod connected with the said links, as and for the purpose specified.

4. The combination with a support, of a revoluble shaft, a box wherein said shaft is carried, a bracket on which the box is transversely slidable, a shaft revolubly mounted in the support and run at right angles to the first-named shaft, and a crank-arm fixed to the second-named shaft and engaging the box whereby to impart the necessary movement thereto.

5. The combination with a hopper, of a shaft revolubly mounted therein and having one end extended beyond the same, a bracket carried exteriorly on the hopper and adjacent to the extended end of the shaft, a box slidable transversely in said bracket and revolubly carrying the shaft, the box having an opening therein, a second-named shaft mounted exteriorly on the hopper and run angularly to the first-named shaft, and a crank-arm carried by the second-named shaft and having a projection fitting in the opening of the box.

6. The combination with a frame, of two hoppers or receptacles mounted thereon, a drive-shaft, a feed-screw mounted in one of the hoppers or receptacles and running across the same, gearing driving the feed-screw from the drive-shaft, a chute to which the feed-screw delivers the material of the hopper in which the feed-screw is contained, a distributing-wheel mounted in the second hopper or receptacle, a shaft geared with the drive-shaft and with the distributing-wheel whereby the contents of the said second hopper or receptacle are delivered to the chute, and means for supporting the frame.

JOSEPH W. TERRY.

Witnesses:
J. B. RANKIN,
JOHN M. ROBB.